(12) United States Patent
Bettecken et al.

(10) Patent No.: US 8,054,169 B2
(45) Date of Patent: Nov. 8, 2011

(54) METHOD OF DETECTING A PRESSURE LOSS OF A TIRE, TIRE PRESSURE MONITORING SYSTEM IN A VEHICLE

(75) Inventors: Jürgen Bettecken, Regensburg (DE); Frank Fischer, Regensburg (DE)

(73) Assignee: Continental Automotive GmbH, Hanover (DE)

( * ) Notice: Subject to any disclaimer, the term of this patent is extended or adjusted under 35 U.S.C. 154(b) by 264 days.

(21) Appl. No.: 12/420,841

(22) Filed: Apr. 9, 2009

(65) Prior Publication Data

US 2009/0256694 A1    Oct. 15, 2009

(30) Foreign Application Priority Data

Apr. 9, 2008   (DE) .................. 10 2008 018 015

(51) Int. Cl.
*B60C 23/02* (2006.01)
(52) U.S. Cl. ........ 340/442; 340/444; 340/445; 340/447; 73/146; 73/146.2; 73/146.3; 73/146.5; 701/45
(58) Field of Classification Search .................. 340/442, 340/444, 445, 447, 448; 73/146, 146.2, 146.3, 73/146.5; 701/29, 30, 45
See application file for complete search history.

(56) References Cited

U.S. PATENT DOCUMENTS

| | | | |
|---|---|---|---|
| 5,942,971 A * | 8/1999 | Fauci et al. | 340/442 |
| 6,340,929 B1 * | 1/2002 | Katou et al. | 340/447 |
| 6,744,357 B2 | 6/2004 | Itou et al. | |
| 6,945,103 B1 | 9/2005 | Lee et al. | |
| 2003/0011472 A1 | 1/2003 | Itou et al. | |
| 2005/0258949 A1 | 11/2005 | Iwazumi | |

FOREIGN PATENT DOCUMENTS

| | | |
|---|---|---|
| DE | 10232205 A1 | 4/2003 |
| DE | 60119441 T2 | 4/2007 |

* cited by examiner

*Primary Examiner* — Hung T. Nguyen
(74) *Attorney, Agent, or Firm* — Laurence A. Greenberg; Werner H. Stemer; Ralph E. Locher (57) ABSTRACT

A method for detecting a pressure loss of a tire in a vehicle equipped with a tire pressure monitoring system. The method includes the following steps carried out in the parked state of the vehicle: deactivate the tire pressure monitoring system, which contains at least one electronic wheel device disposed in a vehicle wheel, activate the tire pressure monitoring system after a first defined period of time or upon a vehicle-side request, determine tire-related information of the vehicle wheels associated with the electronic wheel devices by the respective electronic wheel device and generate status signals containing the tire-related information, communicate the status signals to an evaluation device, return to the first method step at the latest after a second period of time.

21 Claims, 4 Drawing Sheets

FIG. 4

METHOD OF DETECTING A PRESSURE LOSS OF A TIRE, TIRE PRESSURE MONITORING SYSTEM IN A VEHICLE

CROSS-REFERENCE TO RELATED APPLICATION

This application claims the priority, under 35 U.S.C. §119, of German application DE 10 2008 018 015.7, filed Apr. 9, 2008; the prior application is herewith incorporated by reference in its entirety.

BACKGROUND OF THE INVENTION

Field of the Invention

The invention relates to a method of detecting a pressure loss of a tire in a vehicle equipped with a tire pressure monitoring system. The invention further relates to a tire pressure monitoring system, a vehicle, and a computer product program.

The field of the present invention is systems for monitoring or determining tire-specific parameters. Such systems are generally referred to as tire information systems, tire monitoring systems or tire pressure monitoring systems.

As vehicle safety and reliability are central factors in automotive engineering, for safety reasons alone the tire pressure of motor vehicles has to be regularly checked. As this is often neglected, modern motor vehicles increasingly have tire pressure monitoring systems, which are intended to automatically measure the tire pressure and provide early detection of a critical deviation of the measured tire pressure from a tire pressure setpoint value.

A tire pressure monitoring system typically contains at least one electronic wheel device per wheel, which is disposed for example in the region of the wheel rim and contains a sensor for acquiring tire-specific parameters of the respective wheel and sending out information derived from this measured value of the parameters. The electronic wheel device is equipped with a sending aerial, by which the acquired information may be sent to a vehicle-side receiving device. On the vehicle side the tire pressure monitoring system contains at least one receiving device, by which the radio signals emitted from the electronic wheel device are picked up and routed to a central processing unit of the vehicle for further evaluation.

A special functionality of a tire pressure monitoring system relates to so-called parked monitoring. With parked monitoring, the electronic wheel devices are activated also in the parked state and in this case determine tire-specific parameters, such as for example the tire pressure. During the parked state these collected tire-specific parameters are sent to the central control and evaluation device, where they are evaluated. The particular advantage of this parked monitoring functionality is that, when the vehicle is next started up, the actual tire-specific parameters are immediately available.

In a tire pressure monitoring system without this parked monitoring functionality the requisite tire-specific parameters are determined only after start-up of the vehicle and are therefore available to the driver only at the start or shortly after the start of a fresh journey. While for most passenger vehicles this delay in the availability of the tire-specific parameters is substantially tolerable, it poses a problem particularly for commercial vehicles, such as heavy goods vehicles (HGV) of a haulage company. Often such HGVs are loaded before the start of a fresh journey. The wheels of the vehicle are accordingly subjected to extreme stress. As a result of this stress it may happen that for example the tire pressure of one or more wheels falls below a minimum threshold value, thereby making it necessary to change this wheel in order to guarantee that the vehicle is in proper working order. As this could not be detected before the start of the journey, the cargo would either have to be unloaded from the HGV or its trailer in order to change the defective tire or tires or the cargo would have to be reloaded onto a different HGV. Both measures entail a loss of time and with it a temporary vehicle failure that particularly in the case of heavy goods vehicles, which should have as little time laid-up as possible, is especially serious.

For these reasons, it is particularly advantageous above all especially for such commercial vehicles if they have the previously described parked functionality for the tire pressure monitoring system.

Generally known tire pressure monitoring systems with such a parked monitoring functionality are, on the one hand, permanently activated in the parked state and hence even in the parked state determine the appropriate tire-specific parameters and send corresponding signals to the vehicle-side evaluation device. Because during parked monitoring these functional units are permanently activated, this method is relatively energy-intensive and, as the vehicle and the electronic wheel devices are supplied with energy only from local energy sources, use of this method over a prolonged period is impossible or possible only to a qualified extent.

In another, generally known method the electronic tire device determines the tire pressure continuously, for example at preset intervals. The electronic tire device sends information about the tire pressure to the vehicle-side evaluation device only if the tire pressure falls below a defined threshold. This occurs also in the parked state. The advantage of this solution is that the information about the tire pressure is available immediately after a fresh start-up of the vehicle. With this method, however, the local energy supply of the electronic tire device is in particular very quickly exhausted. What is more, this method does not take account of the laden state and hence of the stress acting upon the vehicle wheel that is to be monitored. With this method, moreover, it is impossible to detect from the electronic tire device whether the signal it has sent has also actually been received at the vehicle side.

SUMMARY OF THE INVENTION

It is accordingly an object of the invention to provide a method of detecting a pressure loss of a tire, a tire pressure monitoring system, a vehicle, and a computer product program that overcomes the above-mentioned disadvantages of the prior art methods and devices of this general type, which detects the tire pressure of a vehicle situated in the parked state in an energy-optimized manner.

There is accordingly provided a method of detecting a pressure loss of a tire in a vehicle equipped with a tire pressure monitoring system. The method includes the following steps carried out in the parked state of the vehicle: deactivate the tire pressure monitoring system, which contains at least one electronic wheel device disposed in a vehicle wheel, activate the tire pressure monitoring system after a first defined period of time or upon a vehicle-side request, determine tire-related information of the vehicle wheels associated with the electronic wheel devices by use of the respective electronic wheel device and generate status signals containing the tire-related information, communicate the status signals to an evaluation device, return to the first method step at the latest after a second period of time.

A tire pressure monitoring system for or in a vehicle, contains at least one electronic wheel device, which is disposed in a vehicle wheel of the vehicle having a parked monitoring device, which is configured to implement a method according to the invention in the parked state of the vehicle.

A vehicle, in particular a tractor and/or the trailer of a lorry, which has a plurality of vehicle wheels each containing a wheel rim and a tire fitted thereon and which is equipped with the tire pressure monitoring system according to the invention.

In addition, a computer program product, which defines an algorithm that contains the method according to the invention, is provided.

The present invention presupposes that the tire pressure monitoring system of a vehicle is equipped with a so-called parked monitoring functionality, whereby the central control and evaluation device of the vehicle may be activated at least intermittently also in the parked state of the vehicle. In the parked monitoring mode the control and evaluation device of the vehicle has a reduced functionality, which is however at least capable of "waking up" the electronic wheel devices associated therewith by a corresponding signal so that these electronic wheel devices in the parked state may determine tire-specific parameters and send them back to the control and evaluation device. This has the particular advantage that even before the start of a fresh journey and hence still in the parked state the actual tire information and in particular the actual tire pressure of the various wheels of the vehicle may be displayed for a vehicle driver.

This is particularly advantageous for vehicles, for which it is important to be informed about a possible defect in a vehicle wheel and in particular about a pressure loss in a vehicle wheel before the start of a journey. This applies above all, but not exclusively, to commercial vehicles such as HGVs and tractor-trailers. In this way possible defects of the vehicle wheel, such as for example too low a tire pressure, may be detected and eliminated before, for example, such a vehicle is loaded for the next journey. As a result, extended periods laid-up because of a final loading and/or reloading of the cargo of the commercial vehicle are reduced to a minimum.

The underlying idea of the present invention is that during a parked state of a vehicle first to deactivate the parked monitoring. The parked monitoring is however activated regularly after a defined period of time in order to be able to determine the appropriate tire-related information. The tire-related information is then sent in the form of a status signal to a vehicle-side receiving device in order to enable vehicle-side evaluation of this information. Subsequently or at least after a further defined period of time the parked monitoring mode is deactivated again.

The first and the second defined period of time are so dimensioned that on the one hand the requisite tire-related information may be obtained, sent out in the form of a status signal and also received at the vehicle side. On the other hand, the energy resources both of the energy source of the electronic wheel device and of the vehicle are to be conserved as much as possible. For this reason, the first defined period of time is typically selected relatively long compared to the second defined period of time, i.e. in the range of several hours to one or a few days, while the second defined period of time is in comparison shorter, typically in the region of one hour or less.

The particular advantage of the present invention is that in the parked state of the vehicle the parked monitoring mode does not remain continuously switched on. Rather, the parked monitoring mode is activated regularly, i.e. at regular intervals in each case for a relatively short duration in order then to be able to determine the appropriate tire-related information and send it to a vehicle-side evaluation device. Subsequently or after a defined time the parked monitoring mode is then deactivated again and also remains deactivated for a comparatively longer period of time. Because the parked monitoring mode is activated only for a short time and then deactivated for a longer time, the energy requirement for supplying the parked monitoring function of the tire pressure monitoring system is reduced to a minimum. Equally, however, it is thereby ensured that this tire-specific information and in particular the tire pressure is made available to the driver of the vehicle before the start of a fresh journey so that, particularly in the event of a fault, he may initiate the appropriate countermeasures before setting out on a journey.

In a typical refinement, the second period of time is markedly shorter than the first period of time. Markedly shorter, in this connection, means that the second period of time is shorter for example at least by the factor 10 and in particular by the factor 25 than the first period of time. For example, the first period of time is at least 6 hours and in particular at least 12 hours. Preferably, the first period of time is at most 24 hours. The second period of time is for example at most 90 minutes and in particular at most 30 minutes. The second period of time depends for example upon the intervals, at which the electronic wheel device sends.

The electronic wheel device in the parked state is preferably always activated and is therefore configured to pick up tire-specific information also in the parked state and send it out in the form of status signals. Alternatively, the wheel electronic device may be "woken up" by the vehicle-side control device. The generated status signals are sent from the electronic wheel device in the parked state at intervals, i.e. in each case after a third defined period of time. This third defined period of time is preferably at least shorter than the second defined period of time. In this way it may be ensured that within the second period of time, during which at the vehicle side the tire pressure monitoring system is activated, a status signal is sent also at least once from the respective electronic wheel device to the vehicle-side receiving device. In case the electronic wheel device sends out the appropriate status signals in a time interval of for example 30 minutes (i.e. third period of time), the second period of time would therefore have to be at least 30 minutes.

In a particularly preferred refinement, the second period of time is lengthened if from at least one electronic wheel device no status signal was able to be received at the vehicle side. In particular, the second period of time is lengthened in such a way that from the various electronic wheel devices a total of two or more status signals may then be sent out within the second period of time. If however after a correspondingly lengthened period of time it is still not possible to receive a status signal from the electronic wheel device or devices at the vehicle side, then the tire monitoring system is deactivated again, even though a status signal has not been received from all of the electronic wheel devices. In this case, it is assumed for example that even with a further lengthened period of time not all of these electronic wheel devices are possibly able to send a status signal to the vehicle-side receiving device because they are situated for example in a send and/or receive dead spot. It may be assumed for example that, if an electronic wheel device sends out 2 to 4 status signals but these cannot be received at the vehicle side, then such a state of a send and/or receive dead spot exists. This is to be taken into account in the case of lengthening of the second period of time, i.e. in this case the second period of time should be at least two to four times the third period of time. This prevents excessive demands being placed on the energy source of the tire pressure monitoring system.

In a particularly preferred refinement, the tire pressure monitoring system is immediately deactivated as soon as all of the electronic wheel devices have sent their status signals and these status signals have also been received by a vehicle-side receiving device. In this situation the tire pressure monitoring system need not continue to maintain the parked monitoring mode as the objective thereof, namely the sending and receiving of the status signals, has in this case already been prematurely achieved. This is likewise an energy-saving functionality. In addition, it may also be provided that the premature deactivation occurs only after the status signals received at the vehicle side have also been acknowledged and optionally already evaluated at the vehicle side.

In a likewise preferred refinement, the method is terminated after a predetermined number of returns in accordance with the method step (e), provided that the parked state is not interrupted during this time, i.e. in this case the parked monitoring mode remains deactivated during the parked state also after the first period of time. This is likewise an energy-saving functionality as it may for example be assumed that after the predetermined number of returns and hence after the predetermined number of activated parked monitoring modes there is a specific probability that the tire-related information will no longer vary further. A further monitoring of this tire-related information is therefore also obsolete.

In a particularly preferred refinement, an electronic wheel device, which in the method step (c) was unable to determine appropriate tire-related information and/or for which in the method step (d) it was not possible to send the status signals to the evaluation device, remains deactivated after a renewed activation in a subsequent method step (b). This procedure occurs in particular after a return in the method step (e) and after a fresh activation of the tire pressure monitoring system. Here, it is assumed that the electronic wheel device that remains deactivated is either situated in a send and/or receive dead spot or is at any rate defective. In these situations a fresh attempt to determine tire-related information with this electronic wheel device would very probably lead to the same negative results, i.e. the result here would once more be that there was no tire-related information to determine and/or appropriate status signals to be received at the vehicle side.

In a likewise preferred refinement, the status signal is sent from the electronic wheel device to a vehicle-side receiving device, wherein the status signal is sent via a telematic device provided in the vehicle to a vehicle-external evaluation device. Additionally or alternatively, the status signal may be sent to the central control and evaluation device inside the vehicle in order to display the tire-related information directly to the driver. What is more, the company, to whose fleet the vehicle belongs, may therefore initiate countermeasures early, particularly given tire-related information that indicates for example a defect or fault in the vehicle wheel. These countermeasures may for example provide for a change of the inferior tire or, in the case of too low a tire pressure, for a re-inflation of this tire in order to minimize the risk of a flat or burst tire and the cost-intensive interruption of the journey that this would entail.

In a typical refinement, the electronic wheel devices in the parked state are first deactivated and are not activated until a wake-up signal is sent from the vehicle side. This prevents the electronic wheel devices in the parked state from continuously sending signals, which places excessive demands on the vehicle side owing to the deactivated tire pressure monitoring system and hence the receiving device thereof.

In a likewise preferred refinement, immediately after termination of the parked state a determination of the tire-related information is carried out afresh even in electronic wheel devices, which during the parked state were not able to determine tire-related information and/or from which the status signals generated by the electronic wheel device were not able to be received on the vehicle side. This tire-related information may then, i.e. after termination of the parked state, be sent in the form of corresponding status signals to the vehicle-side receiving device and evaluation device. Thus, for the sake of completeness, even electronic wheel devices that could not be monitored during the parked state for example because of a send and/or receive dead spot may send their status signals.

In a particularly preferred refinement, the status signal contains information about the tire pressure. In particular, the vehicle-side evaluation device outputs an error signal if the determined tire pressure falls below a defined pressure threshold. This error signal is available to the vehicle driver and/or a control centre of the fleet, to which the vehicle belongs, even before the start of a fresh journey. In a particularly preferred refinement, this defined threshold is adjustable, for example in dependence upon the loaded state of the vehicle. In this way, it is possible to take account of the loaded state of the vehicle and the stress acting upon a respective tire in the unladen and laden state.

In a particularly preferred refinement, the first defined period of time is shortened and/or the second defined period of time is increased if in the course of evaluation it emerges that the tire-related information contains an error or at least a deviation of the respective tire-related information from a defined standard range. In this way too, a faulty deviation may be counteracted early.

In a particularly preferred refinement, the electronic wheel device contains a sensor for determining the tire-related information. Such tire-specific information is for example the tire temperature, the tire pressure, the rotational speed of a tire, the tread thickness etc. In particular the electronic wheel device contains a pressure sensor, which also in the parked state is configured to determine the tire pressure of the wheel associated with this electronic wheel device.

In a preferred development, the monitoring device contains a telematic device, by which the status signals may be sent as radio signals to a vehicle-external evaluation device. The telematic device may be for example a component part of the navigation system and/or of a radio telephone in the motor vehicle. These devices are naturally in communicative connection with base stations and in this way may be connected by a simple function extension also to a vehicle-external control centre, for example within a haulage company.

It is likewise preferred if the parked monitoring device contains an electronic-wheel-side memory device, in which the status signals and/or the wheel-specific information may be stored at least for the duration of the parked state. Preferably, the memory device and/or a vehicle-side evaluation device is reset to its initial state after termination of the parked state and before a fresh parked state.

In a particularly preferred refinement, the parked monitoring device contains a time generator, which defines the first and/or the second defined period of time. This time generator may for example take the form of a clocked counter.

The refinements and developments of the invention described in detail above may—unless otherwise stated—be combined freely with one another.

Other features which are considered as characteristic for the invention are set forth in the appended claims.

Although the invention is illustrated and described herein as embodied in a method of detecting a pressure loss of a tire, a tire pressure monitoring system, a vehicle, and a computer product program, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
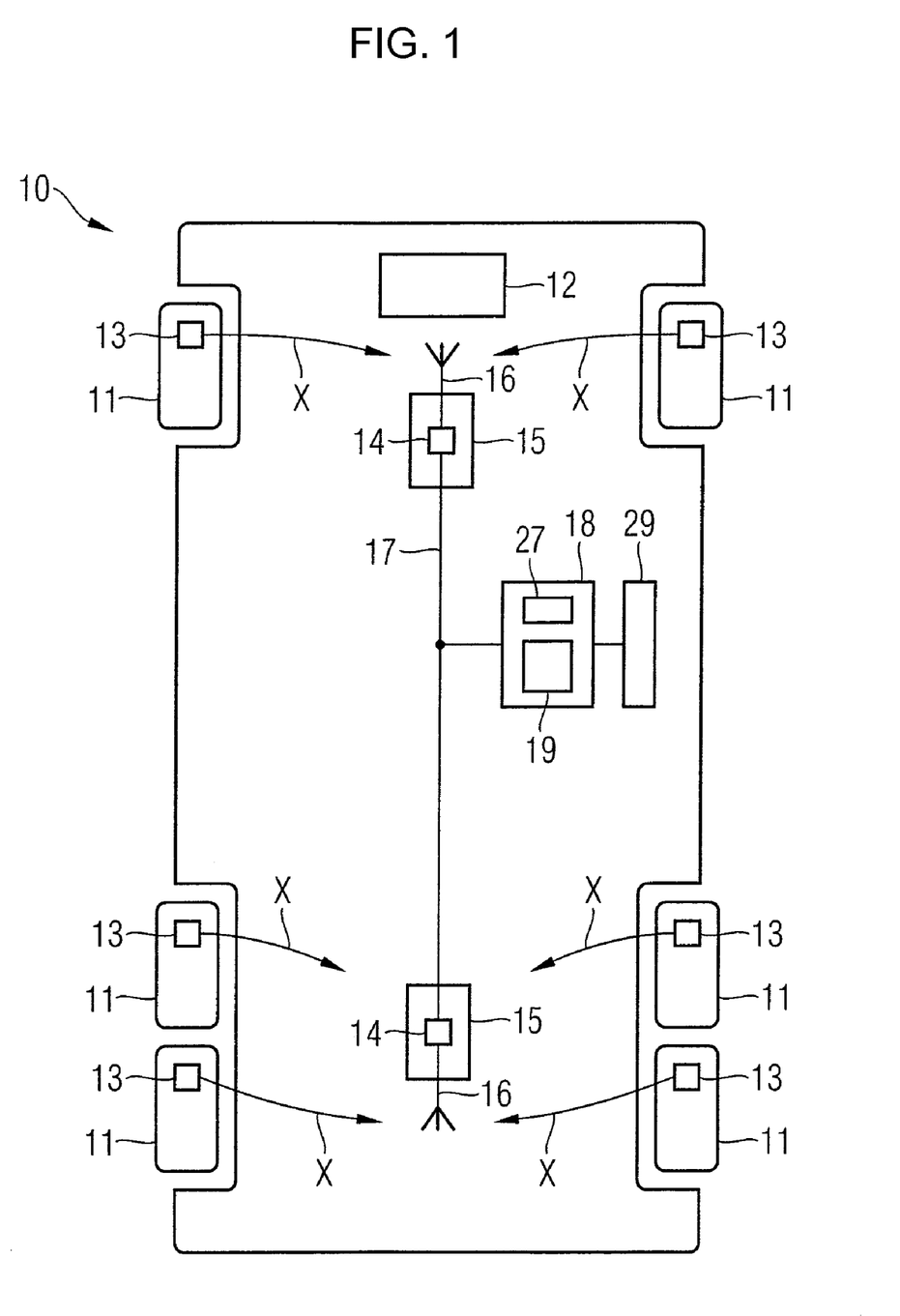
FIG. 1 is a schematic plan view of a vehicle for the purpose of explaining an embodiment of a tire pressure monitoring system according to the invention.

In the figures of the drawing, unless otherwise indicated, identical and functionally identical elements, features and signals are provided with the same reference characters. Referring now to the figures of the drawing in detail and first, particularly, to FIG. 1 thereof, there is shown an extremely simplified schematic representation of a vehicle for the purpose of explaining an embodiment of a tire pressure monitoring system according to the invention. In FIG. 1 reference character 10 denotes a vehicle, for example a heavy goods vehicle (HGV). The vehicle 10 here has merely by way of example six wheels 11. The vehicle 10 further has a tire pressure monitoring system according to the invention, which contains wheel-side electronic wheel devices 13, vehicle-side receiving devices, a bus 17, and a control unit 18. One electronic wheel device 13 is associated with each individual wheel 11. The electronic wheel device 13 is disposed in a manner known per se in the region of the valve or the rim of the respective wheel 11.

Figure 2:
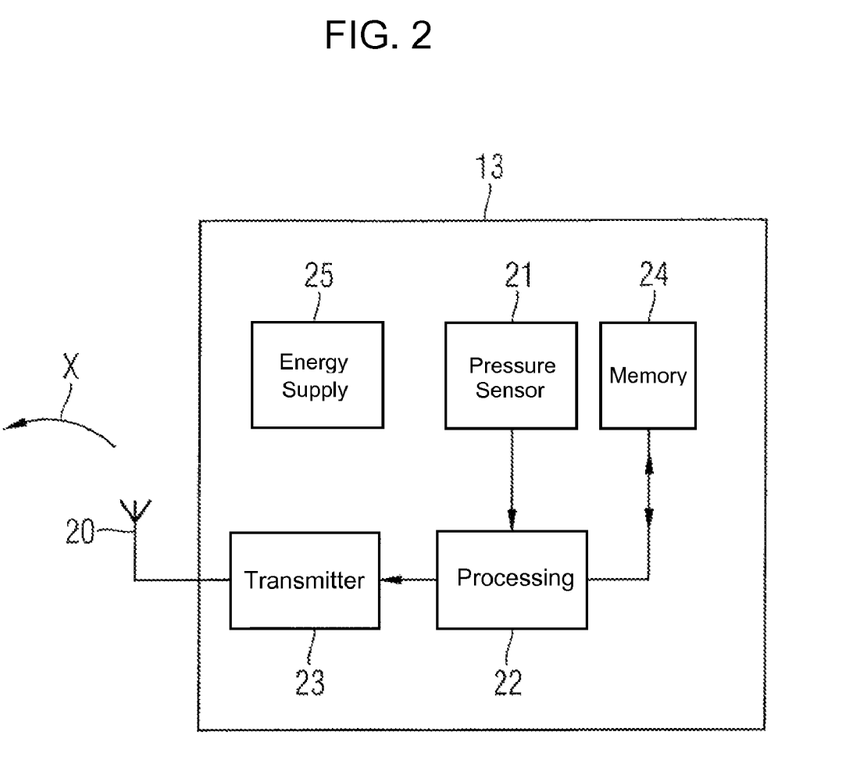
FIG. 2 is a block diagram of an exemplary layout of an electronic wheel device of a tire pressure monitoring system according to the invention.

FIG. 2 shows in a block diagram a schematic layout of an electronic wheel device 13. The electronic wheel device 13 in the case of the present embodiment contains a pressure sensor 21, a processing device 22 connected to the pressure sensor 21, an internal memory 24, and a transmitter 23 connected to the processing device 22. These elements 21-24 are supplied with electrical energy in each case from a local energy supply 25, for example an accumulator or a battery. The wheel sensor 21 is configured to determine tire-specific parameters, such as for example the tire pressure. The processing device 22 of the electronic wheel device 13 carries out a pre-evaluation of the information obtained by the wheel sensor 21. The wheel-specific information determined by the electronic wheel device 13 is modulated and/or encoded in a transmission signal X, which here is referred to also as status signal X and is sent via a wireless communication link to the vehicle 10. For this purpose, each electronic wheel device 13 contains a sending aerial 20 as a component part of the transmitter 23.

For receiving the sent transmission signals X the tire pressure monitoring system contains at the vehicle side at least one and in the present case two receiving devices 15, each of which contains a receiving aerial 16. The receiving device 15 is supplied in a manner not represented here with electrical energy from an energy source 12 of the HGV 10, for example the vehicle battery, and contains in each case a receiving aerial 16 and a receiving stage 26.

The tire pressure monitoring system further contains at the vehicle side a microprocessor 19 as an example of a central control and evaluation device 19. The microprocessor 19 and optionally also the receiving stage with the receiving aerial 16 are component parts of the control unit 18 for the tire pressure monitoring. The control unit 18, the receiving devices 15 and the electronic wheel devices 13 are provided for the purpose of measuring the respective tire pressures in the various wheels 11, evaluating the measured tire pressures and visually or audibly informing a person driving the HGV, who is not represented in detail, if one of the tires for example has too low a tire pressure.

The tire pressure monitoring system further contains a bus 17, for example a single- or two-wire CAN bus (CAN=controller area network) or a LIN bus (LIN=local interconnect network), to which the receiving devices 15 and the control unit 18 are connected by respective connection lines.

The tire pressure monitoring system according to the invention further has a parked monitoring device. The functionality of the parked monitoring device is implemented i.e. in the electronic wheel devices 13 and the central control and evaluation device 19. The electronic wheel device 13 here is merely by way of example configured in such a way that it is or may be activated also in a parked mode of the vehicle 10. In this parked mode the central control and evaluation device 19 of the vehicle 10 may be in a so-called parked monitoring mode, in which it is activated for the purpose of parked monitoring at least intermittently and in particular at regular intervals.

The HGV further contains a telematic device 29, which is connected for example to the control unit 18 and via which the picked-up status signals X may be sent also to a vehicle-external central evaluation device (not represented in FIG. 1). The vehicle-external central evaluation device may be for example a central computer of a company, to whose fleet the lorry belongs.

Figure 3:
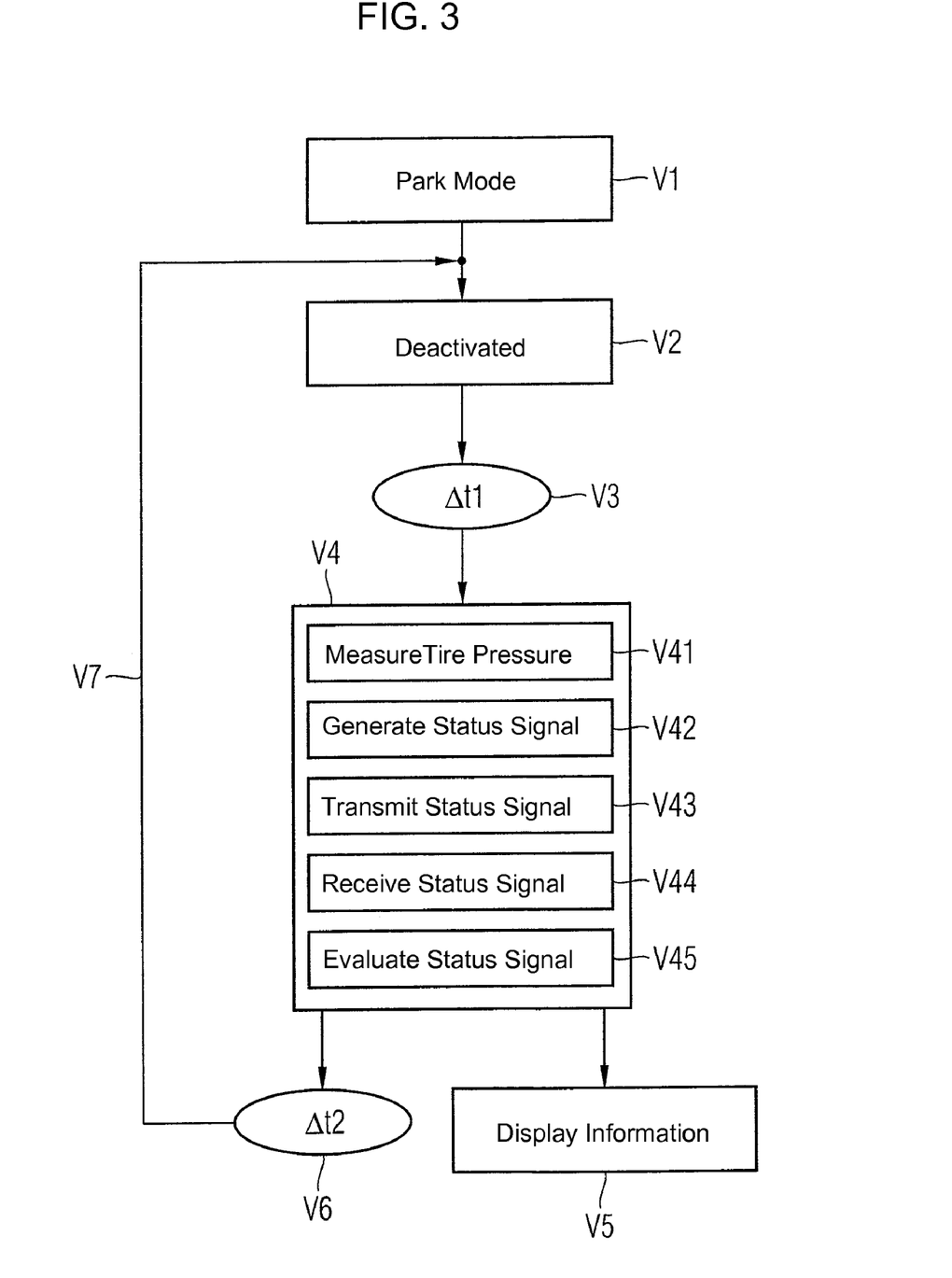
FIG. 3 is a sequence diagram for explaining a first embodiment of the method according to the invention.

There now follows a detailed description of this mode of operation of the parked monitoring device according to the invention with reference to the sequence diagram in FIG. 3.

It is assumed that at the start of the method according to the invention the vehicle is in a parked mode V1.

In the parked mode, the tire pressure monitoring system is first deactivated in the method step V2, i.e. initially the electronic wheel devices 13 do not send any status signals X to the vehicle-side evaluation device 19.

This deactivated state of the tire pressure monitoring system is maintained for the first defined period of time $\Delta t1$ (step V3). This defined period of time $\Delta t1$ is preferably adjustable and, depending on the application, user requirement, existing energy resources etc., is in the region of a few hours to a few days. A typical value of the first period of time $\Delta t1$ is: $\Delta t1=6$ h-24 h.

After the first defined period of time $\Delta t1$, at least the parked monitoring functionality of the tire pressure monitoring system is activated (step V4). In the activated state measurement signals relating to tire-specific parameters, for example the tire pressure, are picked up by the electronic wheel device 13 (step V41). From these measurement signals the electronic wheel device 13 generates a status signal X (step V42) that contains information about the measured tire-specific parameter or parameters. The status signal X is sent out in the next sub-step V43 and is picked up in the sub-step V44 by a vehicle-side receiving device 15 specifically provided for this purpose. After corresponding routing of this status signal X to the evaluation device 19, the status signal is then evaluated in the sub-step V45.

In the step V5 the information thus evaluated is displayed for example for the vehicle driver. This may occur preferably even before the start of a fresh journey, i.e. while still in the parked state, or alternatively upon or shortly after the start of a fresh journey. It would additionally or alternatively be possible to display the tire-specific information obtained in the step V4 via a telematic device to a vehicle-external user.

The parked monitoring mode remains activated for a second defined period of time $\Delta t2$ (step V6). The second period of time $\Delta t2$ corresponds at least to the time, during which an electronic wheel device 13 is typically intermittently activated, i.e. picks up measurement signals and sends out status signals X derived therefrom.

After the second defined period of time $\Delta t2$ the method returns (step V7). As a result, the tire pressure monitoring system and in particular its parked monitoring functionality are deactivated again in the step V2. This return after the second defined period of time $\Delta t2$ (steps V6, V7) occurs even if in the step V4 status signals X have not been generated by all of the electronic wheel devices 13 and/or been received by the vehicle-side receiving device.

In an extension it may also be provided that the method returns already some time before achieving the second defined period of time $\Delta t2$ (step V7), if for example at the vehicle side corresponding status signals X have been received from all of the electronic wheel devices 13 of the tire pressure monitoring system. In this situation, there is therefore no longer any need to continue to maintain the parked monitoring mode. This is therefore an energy-saving extended function.

Figure 4:
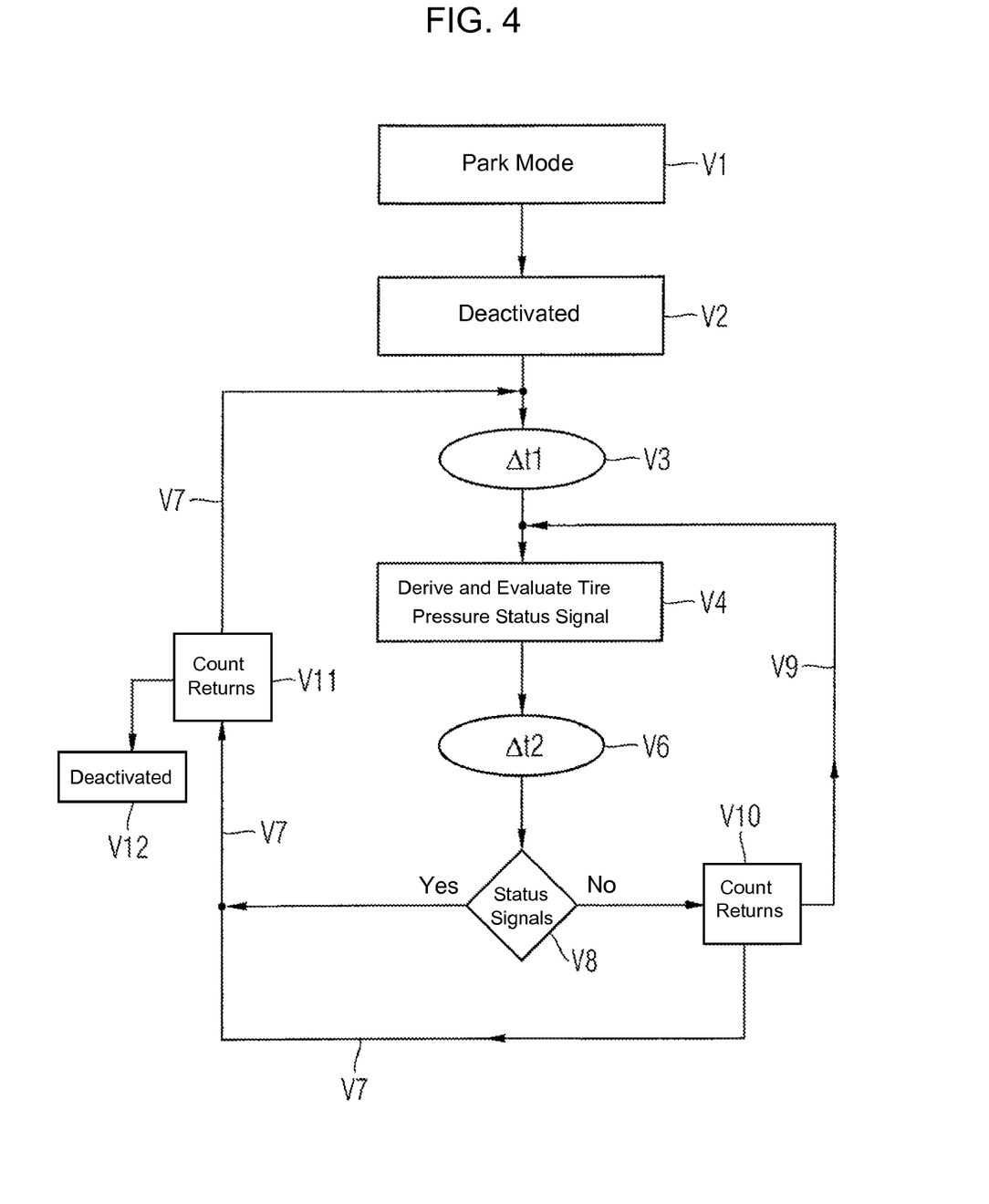
FIG. 4 is a sequence diagram for the purpose of explaining a second embodiment of the method according to the invention.

FIG. 4 shows a method according to the invention that is extended compared to the first embodiment in FIG. 3.

In contrast to the embodiment in FIG. 3, in FIG. 4 after the second defined period of time $\Delta t2$ in step V6 it is checked whether at the vehicle side status signals X have been received from all of the electronic wheel devices 13. If status signals X have been received from all of the electronic wheel devices 13, then the method returns as in FIG. 3 (step V7). If, on the other hand, in the step V8 it is identified that at the vehicle side there are not status signals X from all of the electronic wheel devices 13, then the method returns in the step V9 to the method step V4. As a result, for a further second period of time $\Delta t2$ an attempt is made to obtain status signals X from the respective electronic wheel devices 13. This may be effected at all of the electronic wheel devices 13, regardless of whether status signals have already been obtained from these, or alternatively only at the electronic wheel devices 13, from which status signals have still not been obtained.

This return in the step V9 may be effected until corresponding status signals have been obtained from all of the electronic wheel devices 13. If an electronic wheel device 13 is defective or is situated in a send and/or receive dead spot, it may from time to time be impossible to receive corresponding status signals X from this electronic wheel device 13 at the vehicle side. In order therefore not to place excessive demands on the limited energy resources 12, 25 of the electronic wheel device 13 and the vehicle 10, according to the invention it is provided that after a defined number of returns V9, which are counted in the step V10, this method and therefore the attempt to obtain corresponding status signals X from all of the electronic wheel devices 13 is aborted. The method then returns in the step V7, so that the tire pressure monitoring system and/or the parked monitoring mode may then be deactivated again.

It may additionally also be provided that after a defined number of returns V7, which are counted in the step V11, the method according to the invention, i.e. the activating and deactivating of the parked monitoring mode at regular intervals, is aborted. In this case, in the method step V12 the tire pressure monitoring system and hence also its parked monitoring functionality is permanently deactivated, wherein in this case the deactivated state is maintained until the parked state is terminated.

For determining the various periods of time $\Delta t1$-$\Delta t3$ and intervals the vehicle-side tire pressure monitoring system comprises a time generator 27.

The invention is suitable for any vehicles, such as for example buses, tractor-trailers, HGV trailers, passenger cars and the like.

The previously described tire monitoring systems further refer to concrete devices in a vehicle.

The invention claimed is:

1. A method of detecting a pressure loss of a tire in a vehicle equipped with a tire pressure monitoring system, which comprises performing the following steps in a parked state of the vehicle:
   a) deactivating the tire pressure monitoring system having at least one electronic wheel device disposed in a vehicle wheel;
   b) activating the tire pressure monitoring system after one of a first defined period of time and upon a vehicle-side request;
   c) determining tire-related information of vehicle wheels associated with electronic wheel devices by means of the respective electronic wheel device and generating status signals containing the tire-related information;
   d) communicating the status signals to an evaluation device; and
   e) returning to the method step (a) at a latest after a second period of time.

2. The method according to claim 1, which further comprises setting the second period of time to be shorter than the first period of time.

3. The method according to claim 1, which further comprises setting the first period of time to be at least 6 hours and at most 24 hours and setting the second period of time to be at most 90 minutes.

4. The method according to claim 1, which further comprises sending out the status signals via the electronic wheel device in the parked state at intervals after a third period of time, wherein the third period of time is at least shorter than the second period of time.

5. The method according to claim 1, which further comprises lengthening the second period of time if from at least one electronic wheel device no status signal has been received at the vehicle side.

6. The method according to claim 1, which further comprises immediately deactivating the tire pressure monitoring system as soon as all of the electronic wheel devices have sent their status signals and the status signals have been received at the vehicle side.

7. The method according to claim 1, which further comprise terminating the method after a predetermined number of returns if the parked state is not interrupted during this time.

8. The method according to claim 1, wherein the electronic wheel device, which in the method step (c) was unable to determine the tire-related information and/or for which in the method step (d) it was impossible to send the status signals to the evaluation device, remains deactivated after a renewed activation in the method step (b).

9. The method according to claim 1, which further comprises performing one of:
   evaluating the status signals during the parked state via the evaluation device being a vehicle side evaluation device; and
   sending the status signal to a telematic device provided in the vehicle to the vehicle side evaluation device.

10. The method according to claim 1, wherein the electronic wheel devices in the parked state are initially deactivated and not activated until a wake-up signal is sent from a vehicle side.

11. The method according to claim 1, which further comprises immediately after a termination of the parked state, carrying out a determination of the tire-related information afresh at the electronic wheel devices, which during the parked state were unable to determine tire-related information and/or from which the status signals were not able to be received on the vehicle side.

12. The method according to claim 1, which further comprises forming the status signal to contain information about the tire pressure and that an error signal is output if the tire pressure falls below a defined threshold.

13. The method according to claim 1, which further comprises performing at least one of shortening the first defined period of time and increasing the second defined period of time if in a course of evaluation it emerges that the tire-related information indicates a fault of the vehicle wheel or contains at least one deviation of the respective tire-related information from a defined standard range.

14. The method according to claim 1, which further comprises setting the first period of time to be at least 12 hours and at most 24 hours and setting the second period of time to be at most 30 minutes.

15. A tire pressure monitoring system for a vehicle, comprising:
   at least one electronic wheel device disposed in a vehicle wheel of the vehicle;
   a parked monitoring device programmed, during a parked state of the vehicle to:
   a) deactivate the tire pressure monitoring system having the at least one electronic wheel device disposed in the vehicle wheel;
   b) activate the tire pressure monitoring system after one of a first defined period of time and upon a vehicle-side request;
   c) determine tire-related information of vehicle wheels associated with electronic wheel devices by means of the respective electronic wheel device and generating status signals containing the tire-related information;
   d) communicate the status signals to an evaluation device; and
   e) return to the method step (a) at a latest after a second period of time.

16. The system according to claim 15, wherein said electronic wheel device has a pressure sensor for determining the tire-related information.

17. The system according to claim 15, wherein said parked monitoring device has a telematic device, by means of which the status signals may be sent as radio signals to the evaluation device being a vehicle-external evaluation device.

18. The system according to claim 15, wherein said parked monitoring device has an electronic-wheel-device memory device, in which the status signals may be stored at least for a duration of the parked state.

19. The system according to claim 15, wherein said parked monitoring device has a time generator that defines at least one of the first and second periods of time.

20. A vehicle selected from the group consisting of a tractor unit and a trailer of a heavy goods vehicle, the vehicle comprising:
   a plurality of vehicle wheels each containing a wheel rim with a tire fitted thereon; and
   a tire pressure monitoring system disposed on said plurality of vehicle wheels, said tire pressure monitoring system containing at least one electronic wheel device disposed in one of said vehicle wheels of the vehicle and a parked monitoring device programmed, during a parked state of the vehicle to:
   a) deactivate said tire pressure monitoring system having at least one electronic wheel device disposed in a vehicle wheel;
   b) activate said tire pressure monitoring system after one of a first defined period of time and upon a vehicle-side request;
   c) determine tire-related information of vehicle wheels associated with electronic wheel devices by means of said respective electronic wheel device and generating status signals containing the tire-related information;
   d) communicate the status signals to an evaluation device; and
   e) return to the step (a) at a latest after a second period of time.

21. A computer-readable storage medium having computer-executable instructions for performing the method according to claim 1.

* * * * *